United States Patent [19]
Young et al.

[11] Patent Number: 5,985,484
[45] Date of Patent: *Nov. 16, 1999

[54] BATTERY SEPARATION

[75] Inventors: James Young, Sunriver; Francis E. Alexander, Corvallis; Daniel E. Weerts, Albany, all of Oreg.

[73] Assignee: AMTEK Research International LLC, Lebanon, Oreg.

[*] Notice: This patent is subject to a terminal disclaimer.

[21] Appl. No.: 08/954,435

[22] Filed: Oct. 20, 1997

[51] Int. Cl.$^6$ ........................................... H01M 2/18
[52] U.S. Cl. ........................ 429/143; 429/147; 429/249
[58] Field of Search .................................. 429/143, 147, 429/249

[56] References Cited

U.S. PATENT DOCUMENTS

| | | | |
|---|---|---|---|
| 4,369,236 | 1/1983 | O'Rell et al. | 429/147 |
| 4,403,024 | 9/1983 | Gordon et al. | 429/146 |
| 5,679,479 | 10/1997 | Young et al. | 429/147 |
| 5,789,103 | 8/1998 | Young et al. | 429/147 |

*Primary Examiner*—Maria Nuzzolillo
*Assistant Examiner*—Angela J. Martin
*Attorney, Agent, or Firm*—Robert E. Howard

[57] ABSTRACT

A battery separator for use in flooded cell type lead acid batteries comprising a backweb of a porous, acid resistant, embossable material with a plurality of major ribs and submini-ribs extending across the width of the backweb from at least one planar surface of the backweb. The submini-ribs extend in a direction substantially parallel to the longitudinal axis of the backweb. The major ribs extend in a direction that is diagonal to the longitudinal axis of the backweb. Each major rib is an embossed corrugated structure comprised of alternating ridges and furrows. The separator is particularly useful in a flooded cell type lead acid battery having tubular plates.

20 Claims, 3 Drawing Sheets

BATTERY SEPARATION

BACKGROUND OF THE INVENTION

This invention relates to a battery separator for use in flooded cell type lead acid batteries.

In a flooded cell type lead acid battery the positive and negative electrodes or "plates" are separated by a battery separator. The battery separator typically has "ribs" or protrusions extending from at least one planar face of the separator. Such ribs are formed in one of several ways: the ribs can be formed integrally with the backweb of the separator; the ribs can be subsequently applied to the backweb as a bead of the same or different material as the backweb; or the ribs can be formed by embossing the backweb. The ribs function to provide proper spacing between the plates and to provide a space wherein free electrolyte resides.

The battery separator currently used by most flooded cell type lead acid battery manufacturers is of the microporous polyethylene type. This type of separator has a composition consisting essentially of an ultra high molecular weight polyethylene, a filler (typically amorphous silica), a plasticizer (typically a processing oil), and certain minor ingredients such as an antioxidant, lubricant and carbon black.

Microporous polyethylene separator material is commercially manufactured by passing the ingredients through a heated extruder, passing the extrudate generated by the extruder through a die and into the nip formed by two heated calender rolls to form a continuous web, extracting a substantial amount of the processing oil from the web by use of a solvent, drying the extracted web, slitting the web into lanes of predetermined width, and winding the lanes into rolls.

Such separators and a method of manufacturing them are described in U.S. Pat. No. 3,351,495.

Microporous polyethylene separators typically have a configuration comprising a backweb having a predetermined thickness, and a plurality of parallel ribs spaced apart a predetermined distance and extending outwardly from one planar surface of the backweb. The ribs extend continuously in a longitudinal direction parallel to the edges of the separator material. The thickness of the backweb and height and spacing of the ribs is specified to the separator manufacturer by the battery manufacturer; the specifications are designed to maximize certain battery characteristics desired by the battery manufacturer. Starting-lighting-ignition ("SLI") lead acid batteries used, for example, in automobiles, tend to have separators that are thinner than "industrial" lead acid batteries used for standby power sources and traction devices.

It is also known to form "mini-ribs" between such "major" ribs to add stiffness to separator webs having thinner backwebs. Generally, such mini-ribs have a lower height than the major ribs and are spaced closer together. The height of such mini-ribs typically varies between about 0.006 inch and about 0.009 inch. The spacing of such mini-ribs varies between about 0.060 inch and about 0.250 inch.

Such ribs (both major and mini) are formed during manufacture of the microporous polyethylene separator by providing that one of the two heated calender rolls forming the nip through which the extrudate from the extruder is fed is engraved with grooves so that the ribs are formed as an integral part of the separator web.

There are many different specifications required by battery manufacturers relative to rib size and rib spacing. In manufacturing separator material to meet customer requirements, almost every change in rib size and spacing requires that the separator manufacturer shut down its manufacturing line in order to remove the engraved roll that had been in use to fill the prior order and to insert a differently configured engraved roll capable of producing the rib size and spacing required for the new order to be filled. Manufacturing time is lost during such shut-down and extra scrap material is generated during start-up of the line.

In addition, integrally formed ribs in the polyethylene type separator undergoes extraction along with the backweb and, because it has relatively more volume than a portion of the backweb occupying the same planar surface area, generally the ribs retain more processing oil than the backweb, thereby raising the overall electrical resistance of the separator.

In commonly owned copending U.S. patent application Ser. No. 08/646,764, filed May 8, 1996, now U.S. Pat. No. 5,679,479, there is disclosed a battery separator having a longitudinal dimension, a width dimension perpendicular to said longitudinal dimension, upper and lower planar faces, and a plurality of ribs (at least three) projecting from at least one planar face, said ribs extending in a direction substantially parallel to the longitudinal dimension (axis) of the separator, each of the ribs being formed of a plurality of individual projecting embossments forming a corrugated structure comprised of alternating ridges and furrows. The ribs may extend from one or both planar faces of the separator. Where the ribs extend from both planar faces, adjacent projecting embossments (ridges) on one planar face are separated by an indentation (furrow) which forms a projecting embossment (ridge) on the other planar face of the separator. Where ribs extend from both planar faces of the separator, the ribs projecting from one planar surface may have a height equal to or different from the height of the ribs extending from the other planar surface.

While the separator described in Ser. No. 08/646,764, now U.S. Pat. No. 5,679,479, performs very well where the rib height does not exceed about 0.030 inch, it has been found that with rib heights in excess of about 0.030 inch compression resistance of the ribs becomes less satisfactory. By "compression resistance" is meant resistance to a compressive force applied to the tops of the ribs. In commonly owned patent application Ser. No. 08/837,286, filed Apr. 11, 1997, now U.S. Pat. No. 5,789,103, there is disclosed an improvement to the separator described in Ser. No. 08/646,764, now U.S. Pat. No. 5,679,479. The improved battery separator of the Ser. No. 08/837,286 patent application, now U.S. Pat. No. 5,789,103, employs an embossable base web comprised of a backweb having a plurality of submini-ribs extending from at least one planar face thereof, the base web being embossed with a plurality of major ribs, each major rib being substantially parallel to the longitudinal axis of the backweb and extending into at least one, and preferably two, adjacent submini-ribs to form a separator having improved compression resistance. The base embossable base web having submini-ribs thereon is separately disclosed and claimed in U.S. patent application Ser. No. 08/837,287 filed Apr. 11, 1997, now U.S. Pat. No. 5,894,055.

The separator disclosed in Ser. No. 08/646,764, now U.S. Pat. No. 5,679,479, and the improved separator disclosed in Ser. No. 08/837,286, now U.S. Pat. No. 5,789,103, have embossed (major) ribs that are disposed substantially parallel to the longitudinal dimension (axis) of the separator, and were designed for use in batteries having flat plates. It has been found that when attempting to use such separators to envelope (wrap) tubular plates the separator tended to nest down around the plate. In addition, acid (electrolyte) stratification and gas release were not satisfactory.

it is an object of this invention to provide a battery separator for use in a flooded cell lead acid battery having tubular plates; the separator having improved nesting resistance, reduced or eliminated acid stratification, and improved gas release.

SUMMARY OF THE INVENTION

This invention relates to a battery separator having a longitudinal dimension, a width dimension perpendicular to said longitudinal dimension, upper and lower planar faces, a plurality of submini-ribs extending from at least one of said planar faces, and a plurality of major ribs extending diagonally across the width of the separator, the major ribs being comprised of individual projecting embossments forming a corrugated structure having alternating ridges and furrows extending through at least some of the submini-ribs.

DESCRIPTION OF PREFERRED EMBODIMENTS

Figure 1:
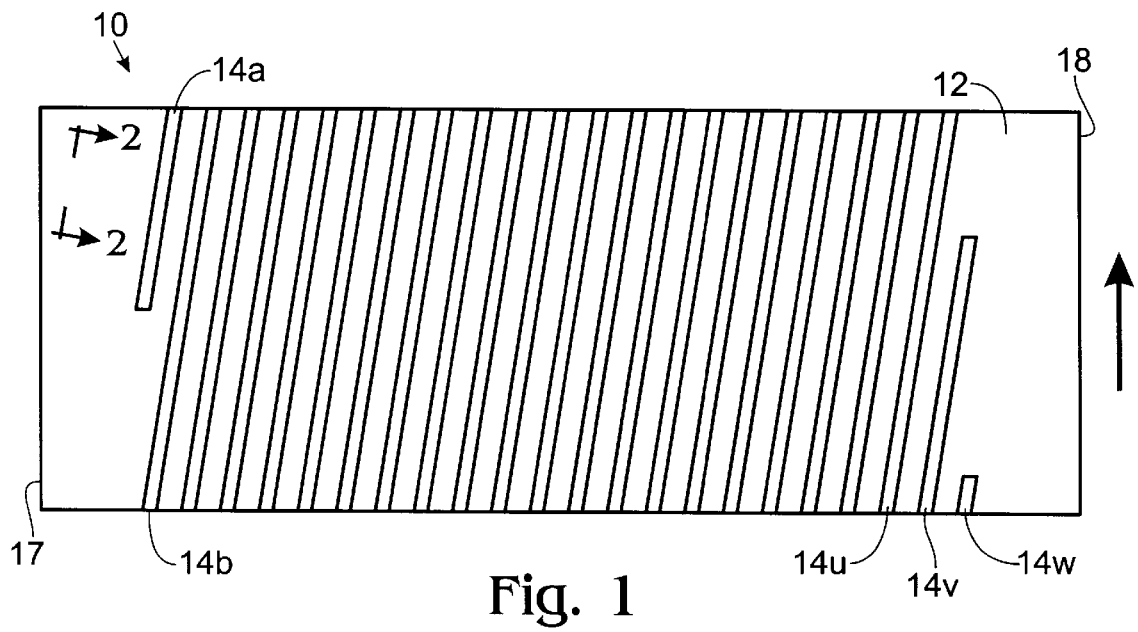
FIG. 1 is a partial top view of the upper planar surface of the separator of this invention showing the relative location of a the major ribs and with the submini-ribs omitted.

FIG. 1 is a partial top view of a piece of the separator 10 of this invention. Projecting from the upper planar surface 12 of separator 10 are a plurality of major ribs 14a through 14w. For the sake of clarity, only major ribs 14a, 14b, 14u, 14v and 14w have been identified on FIG. 1, the major ribs located between 14b and 14u being 14c–14t, respectively. Again, for sake of clarity, only major ribs 14 are illustrated, the submini-ribs being omitted.

The major ribs 14 are disposed across the width of the separator diagonally to the longitudinal axis of the separator 10. The longitudinal axis of separator 10 extends in the direction of the arrow and is parallel to longitudinal edges 17 and 18 thereof. The separator material is manufactured in roll form with the longitudinal dimension being several thousand feet.

The angle of the major ribs 14 to the longitudinal axis of separator 10 may vary between about 6 degrees and about 45 degrees.

In the preferred embodiment the major ribs 14 do not extend all the way to the edge of separator 10, as seen by reference to major ribs 14a, 14v and 14w in FIG. 1. A margin free of major ribs is thereby left to permit overlapping and sealing of the edges of the separator where it is formed into an envelope around a plate. In some applications, however, it may be desirable to extend the major ribs to the edges of the separator.

Figure 3:
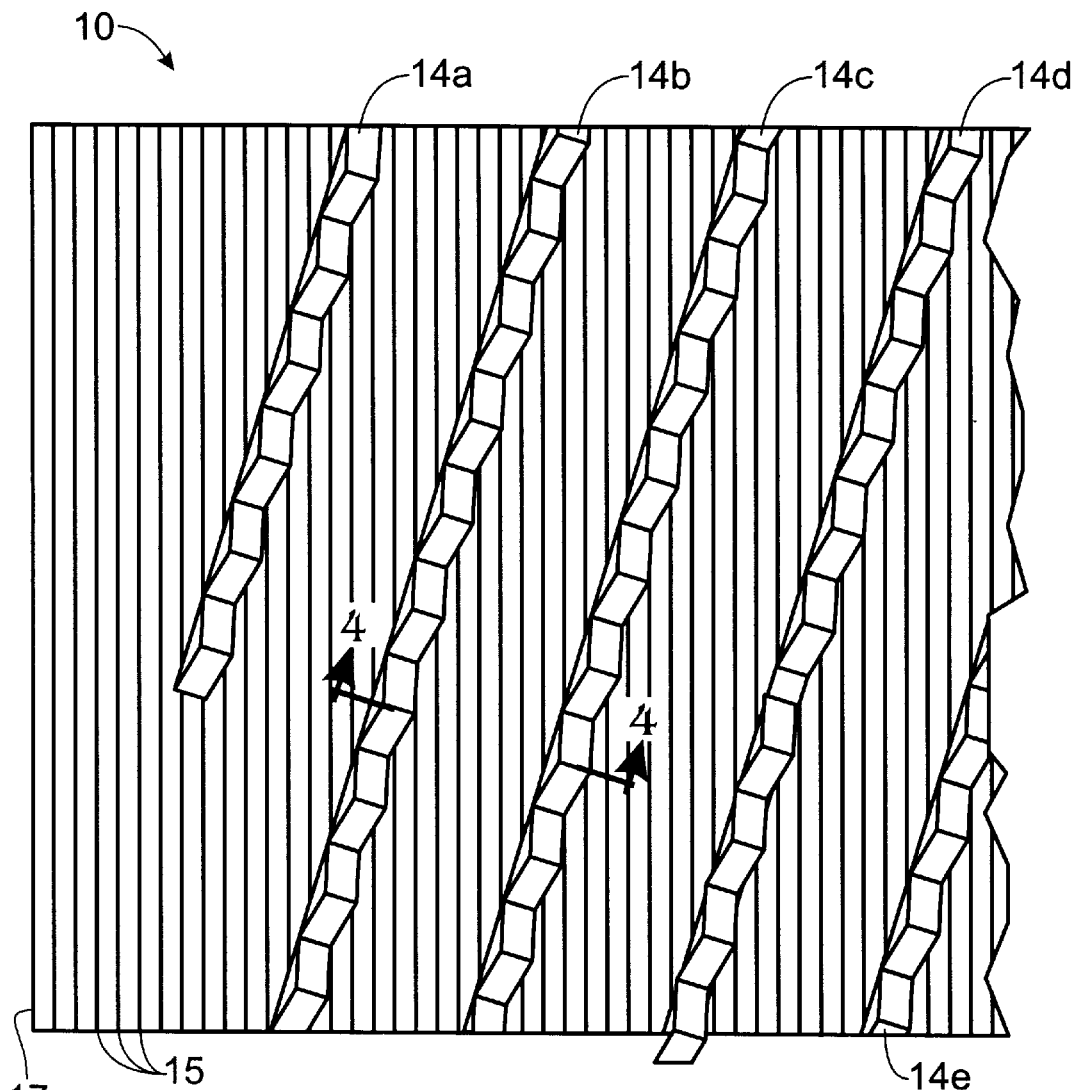
FIG. 3 is a partial perspective top view of the upper planar surface or the separator of this invention showing the relative location of both the major ribs and the submini-ribs.

Also projecting from the upper planar surface 12 of separator 10 are a larger plurality of substantially evenly spaced "submini-ribs" 15, as best seen in FIG. 3. For sake of clarity, not all of the submini-ribs are numerically identified in FIG. 3. These ribs are called "sub-mini ribs" because they are shorter and spaced closer together than prior art mini-ribs. Submini-ribs 15 are disposed substantially parallel to the longitudinal axis of separator 10.

Figure 2:
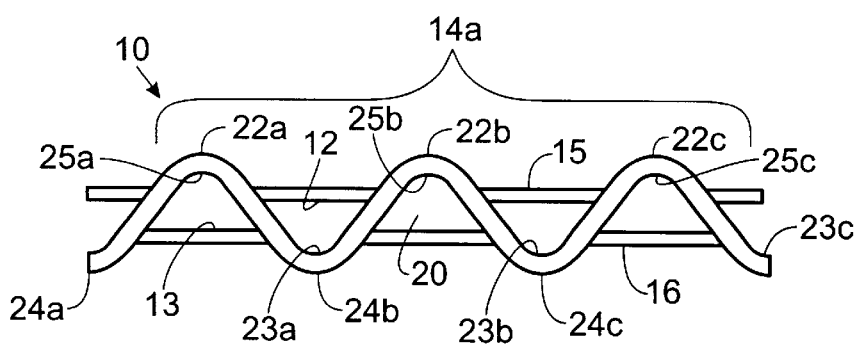
FIG. 2 is an enlarged partial edge view in cross-section of a major rib of the separator of this invention taken along line 2—2 of FIG. 1.
Figure 4:
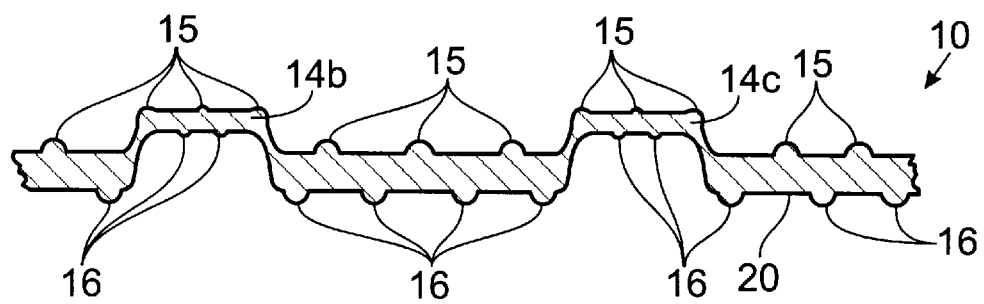
FIG. 4 is an enlarged partial edge view in cross-section of the separator of this invention taken along line 4—4 of FIG. 3.

As can be seen in FIGS. 2 and 4, submini-ribs 16 extend from the lower planar surface 13 of separator 10. Submini-ribs 16 are of the same size and spacing as submini-ribs 15; however, submini-ribs 16 are preferably spaced so that they do not fall in the same plane as submini-ribs 15.

Major ribs 14 are formed by embossing separator 10 to form a corrugated structure, as will be described more fully below.

FIG. 2 is a partial edge view in cross-section of separator 10 taken along Line 2—2 of FIG. 1. Major rib 14a projects above upper planar surface 12 of backweb 20 and below lower planar surface 13 thereof. Adjacent submini-ribs 15 and 16 are shown extending from the upper planar face 12 and lower planar face 13, respectively, of backweb 20.

As can be further seen in FIG. 2, major rib 14a is a corrugated structure comprised of alternating ridges and furrows 22a and 23a, 22b and 23b, 22c and 23c, etc., respectively extending from upper planar surface 12. Likewise, that part of major rib 14a extending from lower planar surface 13 is a corrugated structure comprised of alternating ridges and furrows 24a and 25a, 24b and 25b, 24c and 25c, etc., respectively. A ridge on one planar surface forms the furrow on the other planar surface, and vice versa. For example, the underside of ridge 22a extending from upper planar surface 12 forms the furrow 25a of that portion of major rib 14 extending from lower planar surface 13.

As major ribs 14 are being embossed into the separator base sheet comprised of the backweb 20 and submini-ribs 15 and 16, they are pressed into submini-ribs 15 and 16 at the intersections of the submini-ribs and the lanes forming major ribs 14. Those portions of submini-ribs 15 and 16 thus incorporated into major ribs 14 provide increased compression resistance thereto. The spacing and size of major ribs 14 and submini-ribs 15 and 16 is such that each "section" of a major rib 14 diagonally intersects at least one and preferably at least two or three submini-ribs. By a "section" of a major rib 14 is meant that portion of a major rib encompassed between a ridge and an adjacent furrow and between the edges of the major rib lane extending between said ridge and said adjacent furrow.

Figure 5:
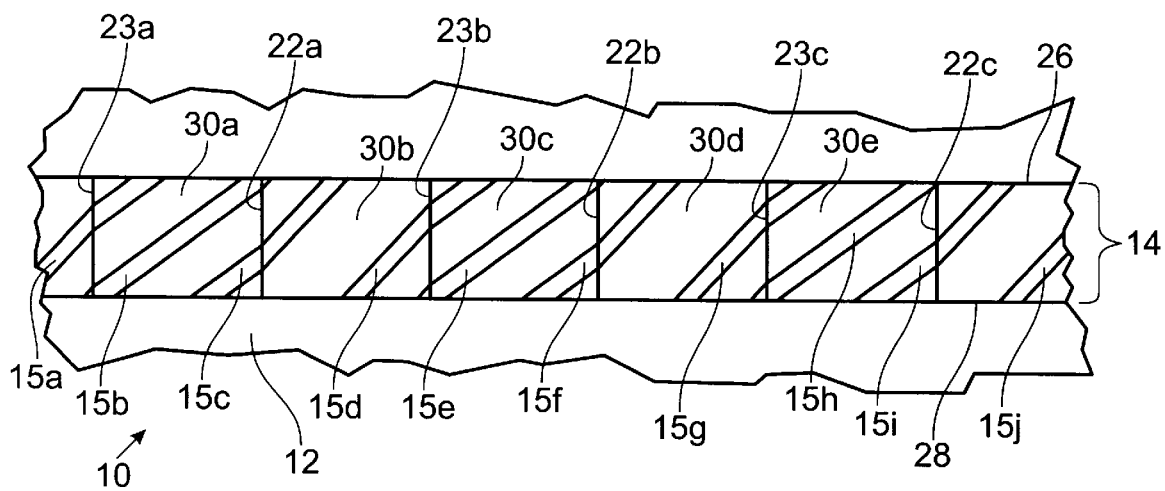
FIG. 5 is a partial top view of a major rib embossed into submini-ribs.

A side view illustrating the relationship between major ribs 14 and submini-ribs 15 and 16 is illustrated in FIG. 4 and a top view of this relationship is illustrated in FIG. 5. In FIG. 5 the various "sections" of major rib 14 are designated by the reference numerals 30a through 30e.

Those portions of submini-ribs 15 and 16 not incorporated into major ribs 14 provide increased stiffness to the separator to thereby allow thinner backwebs to be used than would otherwise be possible.

The relationship of major ribs 14 and submini-ribs 15 and 16 can be seen in cross-section by reference to FIG. 4.

The length dimension of the ridges 22 and 24, i.e., the length of the ridges 22 and 24 from one side wall 26 to the other side wall 28 of major rib 14, is selected in accordance with the desired width of the rib. This dimension will generally be between about 0.020 and about 0.100 inch.

The frequency of the ridges, i.e., the number of ridges per unit of rib length, will preferably be between about 5 and about 25 ridges, per inch.

The height of the ridges 22 and 24 above the respective planar surfaces 12 and 13 of the backweb 20 is selected in accordance with the height of the major ribs 14 specified by the battery manufacturer. This dimension will generally be between about 0.01 to about 0.10 inch. The submini-ribs 15 are particularly useful in providing improved compression resistance when the desired height of major ribs 14 is greater than about 0.030 inch.

The distance between adjacent major ribs 14 will generally be between about 0.25 to about 1.0 inch.

The height of the submini-ribs above the upper planar surface of the separator will generally be between about 0.003 inch and about 0.009 inch. Selection of an appropriate height for the submini-ribs 15 will depend upon the height of the major ribs 14 and the desired compression resistance.

The width of the submini-ribs will generally be between about 0.010 inch and about 0.020 inch.

The submini-ribs 15 will generally be evenly spaced, between about 0.025 inch and about 0.050 inch, across the width of the separator.

The width of the separator of this invention can be any width used by battery manufacturers; generally this width will range between about 2 to about 12 inches with side edges 17 and 18 being parallel to each other.

The thickness of backweb 20 of the separator 10 will typically range between about 0.002 to about 0.025 inch.

For ease of illustration, the corrugated structure forming the rib of this invention illustrated in FIG. 3 is shown as being triangular, with each individual embossed projection thus being wedge shaped. It is preferred, however, to round the wedge shaped embossments, as seen in FIG. 2.

One of the advantages obtained in using the separator of the present invention is that, since the ribs are a corrugated structure formed of adjacent ridges and furrows, and the major ribs are disposed at a diagonal to the longitudinal axis of the separator, when wrapped around a tubular plate the separator provides a substantially barrier free environment for flow of electrolyte and any gases released during charging and discharging since the ribs contact the plates only in the ridge area.

The use of submini-ribs to provide higher major rib height without loss of compression resistance also allows separators to be made with thinner backwebs which means a savings in the amount of material required to make a specified square footage of separator product.

Another advantage to the submini-ribbed separator product is that longer production runs between tooling changes can be made compared to manufacturing separator product with major ribs being formed on the production line. Also, solvent extraction and drying of submini-ribbed product is easier and faster than a product having major ribs formed integrally thereon during manufacture.

Although the separator of the invention is illustrated as having major ribs 14 extending from both planar surfaces 12 and 13 of the backweb 20, the invention is intended to include a separator where the major ribs extend from only one planar face.

Where the major ribs 14 extend from both planar surfaces of separator 10 the height above the ribs 14 above planar surfaces 12 and 13, respectively, of backweb 20, may be the same or the height of the ribs on one side may be greater or lesser than the height of the ribs on the other side.

The submini-ribs 15 and 16 have been described as extending from both planar surfaces of the separator. In such a configuration the submini-ribs on the two planar surfaces may have the same or different heights. However, the separator may be configured so that submini-ribs extend from only one planar face.

In addition, adjacent ridges of a major rib 14 may vary in height.

The formation of the ribs of the present invention involves plastic deformation of the backweb material at the location where the embossing takes place. Plastic deformation indicates that the material was loaded beyond its yield point which, by definition, means that it has experienced plastic flow. It has been shown that oxidation resistance is improved in the area of plastic deformation due to oil being driven to the surface upon collapse of micropores.

Reference is made to copending applications Ser. No. 08/646,764 and 08/837,286 for a description of an apparatus suitable for embossing the major ribs 14 into an embossable separator sheet material. The only change would be in placing the embossing teeth of said apparatus in a pattern diagonal to the axis of the calender roll rather than perpendicular thereto. The entire disclosures of the aforementioned copending patent applications is hereby incorporated by reference.

Although the invention has been described relative to forming ribs in a microporous polyethylene separator, as this is the principal type of separator material currently used by flooded cell type lead acid battery manufacturers, any separator material which is porous, acid resistant and capable of being permanently embossed may be used. These materials may be generally characterized as filled or unfilled films and nonwoven webs of thermoplastic or thermoset polymers. Suitable thermoplastic polymers include polymers and copolymers of ethylene, propylene, butylene, vinyl chloride and styrene. Suitable thermoset compositions include phenolics, ethylene/propylene/diene, isoprene, butadiene, styrene and similar thermosetting polymers.

The ribs have been illustrated in the preferred embodiment disclosed herein as having ridges and furrows that are perpendicularly aligned with the longitudinal edges of the lanes forming major ribs 14. However, the alignment of the ridges and furrows may be such as to form an angle to the longitudinal edges of said lanes. In particular, the alignment may be perpendicular to the longitudinal axis of the separator, or perpendicular to a diagonal line lying along the mirror image of the angle between the diagonal line forming the axis of the major ribs 14 and the longitudinal axis of the separator.

Figure 6:
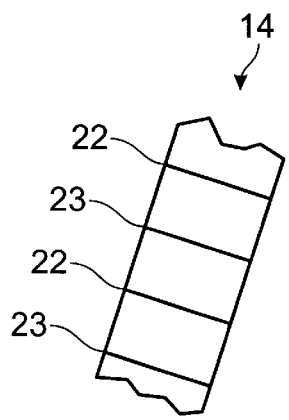
FIGS. 6 through 8 are partial top views of individual major ribs illustrating several variations on the angle of the ridges and valleys of the major rib to the longitudinal axis of the separator.
Figure 7:
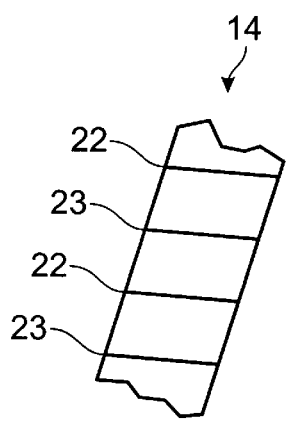
Figure 8:
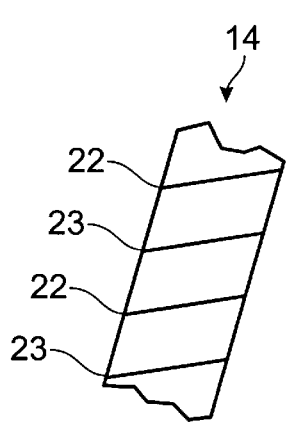

Examples of such alternative configurations are illustrated in FIGS. 6–8.

In addition, the ridges and furrows may have the patterns disclosed in copending patent application Ser. No. 08/646,764. The disclosure of this patent application is hereby incorporated by reference.

The invention claimed is:

1. A battery separator comprising: a backweb of porous, acid resistant, embossable material, said backweb having substantially parallel longitudinal side edges, a longitudinal axis parallel to said side edges, a width dimension perpendicular to said longitudinal side edges, and upper and lower planar surfaces; said separator having a plurality of submini-ribs protecting from at least one planar surface of said backweb, said submini-ribs extending substantially parallel to the longitudinal axis of said backweb; said separator having a plurality of major ribs extending across the width of said backweb diagonally to the longitudinal axis of said backweb, each said major rib being embossed into a plurality of said submini-ribs, each of said major ribs being comprised of lanes of a corrugated structure having substantially parallel side edges with alternating ridges and furrows extending therebetween.

2. The battery separator of claim 1 wherein said backweb is microporous polyethylene.

3. The battery separator of claim 1 wherein said major ribs are at an angle between about 6 degrees and about 45 degrees to the longitudinal axis of said backweb.

4. The battery separator of claim 3 wherein said ridges and furrows are substantially perpendicular to the side edges of the major rib lanes.

5. The battery separator of claim 3 wherein said ridges and furrows are substantially perpendicular to the longitudinal edges of said backweb.

6. The battery separator of claim 3 wherein said ridges and furrows are substantially perpendicular to a line that is at an angle to the longitudinal axis of the backweb that is the mirror image of the angle formed between the longitudinal axis of the backweb and the longitudinal axis of said major rib lanes.

7. The battery separator of claim 1 wherein the frequency of said ridges is between about 5 and about 25 per inch.

8. The battery separator of claim 1 wherein the ridges and furrows of at least some of the major ribs are at a different angle to the longitudinal dimension of the lanes of said major ribs than that of the ridges and furrows of immediately adjacent major ribs.

9. The battery separator of claim 1 wherein said ridges and furrows of at least some of the ribs are in a chevron pattern.

10. The battery separator of claim 1 wherein said ridges and furrows of at least some of the ribs are in a tractor tread pattern.

11. The battery separator of claim 1 wherein said ridges and furrows of at least some of the ribs are in a continuous sinusoidal pattern.

12. The battery separator of claim 1 wherein said submini-ribs are substantially evenly spaced across the width of said separator.

13. The battery separator of claim 12 wherein said submini-ribs are spaced apart by a distance of between about 0.025 inch and about 0.050 inch.

14. The battery separator of claim 1 wherein the width of the major ribs and the spacing of the submini-ribs are such as to cause substantially each section of said major ribs to be embossed into at least two adjacent submini-ribs, said section of said major ribs being the space encompassed by an adjacent ridge and furrow and the adjacent side edges of the lane forming said major rib.

15. The battery separator of claim 14 wherein substantially each section of said major ribs are embossed into three adjacent submini-ribs.

16. The battery separator of claim 1 wherein said submini-ribs have a height above the backweb of between about 0.003 inch and about 0.009 inch.

17. The battery separator of claim 1 wherein said submini-ribs have a height above the backweb of between about 0.003 inch and about 0.006 inch.

18. The battery separator of claim 1 wherein said backweb has a thickness of between about 0.002 inch and about 0.008 inch.

19. The battery separator of claim 1 wherein said major ribs do not extend all the way to the edges of said backweb to thereby form a margin adjacent both side edges of the backweb that is free of said major ribs.

20. The battery separator of claim 1 wherein said submini-ribs extend from both planar faces of said backweb.

* * * * *